United States Patent [19]

Inoue

[11] Patent Number: 5,074,436
[45] Date of Patent: Dec. 24, 1991

[54] PRODUCT FEEDING DEVICE FOR COMBINATION WEIGHER

[75] Inventor: Shinichi Inoue, Kobe, Japan

[73] Assignee: Yamato Scale Company, Limited, Akashi, Japan

[21] Appl. No.: 493,989

[22] Filed: Mar. 15, 1990

[30] Foreign Application Priority Data

Jul. 10, 1989 [JP] Japan .............................. 1-81375[U]
Jul. 10, 1989 [JP] Japan .................................. 1-178799

[51] Int. Cl.⁵ ...................... G01G 13/00; G01G 19/32
[52] U.S. Cl. .................................. 222/56; 177/25.18; 222/63; 222/77; 222/196
[58] Field of Search ...................... 222/56, 63, 77, 196; 177/25.18, 54, 58

[56] References Cited

U.S. PATENT DOCUMENTS

| 4,397,364 | 8/1983 | Hirano | 177/25.18 |
| 4,398,612 | 8/1983 | Mikami et al. | 222/63 X |
| 4,418,771 | 12/1983 | Henry et al. | 177/25.18 X |
| 4,615,403 | 10/1986 | Nakamura | 177/25.18 |
| 4,664,200 | 5/1987 | Mikami et al. | 222/63 X |

Primary Examiner—Kevin P. Shaver
Attorney, Agent, or Firm—Senniger, Powers, Leavitt & Roedel

[57] ABSTRACT

A product feeding device for use in a combination weigher which includes a plurality of conveyor troughs arranged radially for feeding product to corresponding weighing units and a central product feeder for distributively feeding product to the respective conveyer troughs. The device comprises a product detecting device which revolves around the central feeder for sequentially detecting the amount of product carried by each conveyer trough in order to control the amount of product fed to each conveyer trough.

13 Claims, 4 Drawing Sheets

PRODUCT FEEDING DEVICE FOR COMBINATION WEIGHER

BACKGROUND OF INVENTION

This invention relates to a product feeding device included in a combination weigher for feeding product adequately to each of a plurality of weighing units thereof. More specifically, this invention relates to a product feeding device provided with a revolving product detector for detecting the amount of product to be fed to each weighing unit to control adequately the same.

As shown in U.S. Pat. No. 4,664,200, for example, a combination weigher having a plurality of circularly arranged weigh units includes a plurality of radially arranged vibratory conveyer troughs for feeding product to the respective weigh units and a central vibratory dispersion feeder for distributing product to the conveyor troughs, The central dispersion feeder disperses product uniformly to all conveyor troughs. However, only selected conveyor troughs are driven during each combination operation, namely, those troughs corresponding to the weigh units which are unloaded during that cycle of operation. Since the weigh units are usually not selected uniformly during a succession of cycles of operation, uneven and excessive amounts of product tend to accumulate in the conveyor troughs. This can result in excessive amounts of product being loaded into the weigh units. Such nonuniform feed to the weigh units is liable to happen also when the product is massive or lump-shaped and, in a serious case, the maximum feed may be as much as five times the minimum feed. Such variance of feed is undesirable since it reduces the weighing accuracy and lowers the working efficiency of the weigh units.

In the device of the above-cited reference, the thickness of the product layer on the dispersion feeder is detected by an optical detector to control the amount of feed to the dispersion feeder and, on the other hand, the exit of the dispersion feeder to each conveyor trough is provided with a shutter which is opened and closed in synchronism with operation of the corresponding conveyer trough, thereby preventing undesirable feed from the dispersion feeder to the conveyor troughs. Even in this case, however, excessive amounts of product can accumulate inside the shutter and fall off at once on the conveyor trough when the shutter is opened, thereby resulting in nonuniform feed to the corresponding weigh happer.

SUMMARY OF INVENTION

Accordingly, an object of this invention is to provide a novel and improved means for separately detecting the amount of product on each conveyer trough of the abovementioned combination weigher.

Another object of this invention is to provide novel and improved means for controlling the amount of product fed to each conveyer trough based upon detection data supplied from the detecting means.

These objects can be attained by the product feeding device according to this invention.

According to this invention, there is provided, in a combination weigher including a plurality of circularly arranged weigh units, a plurality of radially arranged conveyer troughs for conveying product to the weigh units and a central product dispenser for dispensing product to the conveyer troughs, a product feeding device comprising a detector adapted to receive about the central axis of the product dispenser for sequentially detecting the amount of product carried on each of the conveyer troughs to provide a corresponding detection signal, and means responsive to the detection signal for controlling the amount of product fed from the product dispenser to the corresponding conveyer trough.

These and other objects and features of this invention will be described in more detail below based upon some preferred embodiments with reference to the accompanying drawings.

BRIEF DESCRIPTION OF DRAWINGS

In the drawings.

Throughout the drawings, same reference numerals are given to like structural components.

DESCRIPTION OF PREFERRED EMBODIMENTS

Figure 1:
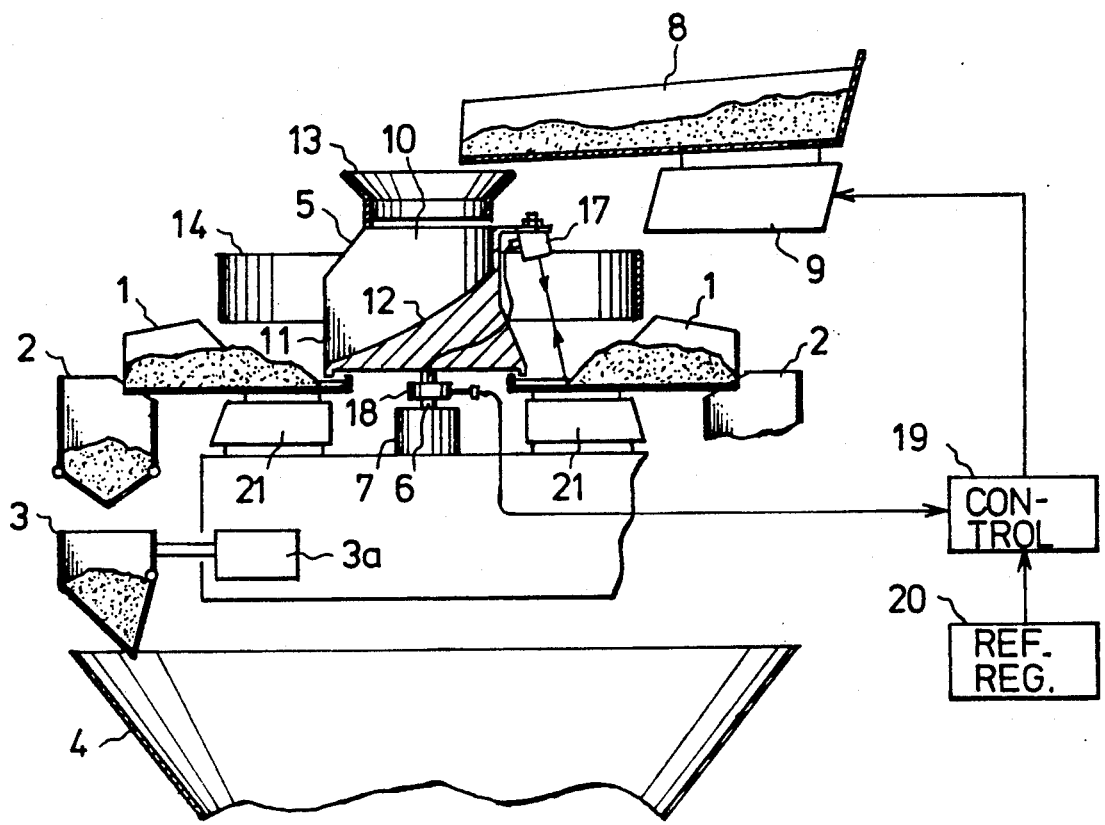
FIG. 1 is a sectional side view showing part of a combination weigher provided with a preferred embodiment of product feeding device according to this invention.
Figure 2:
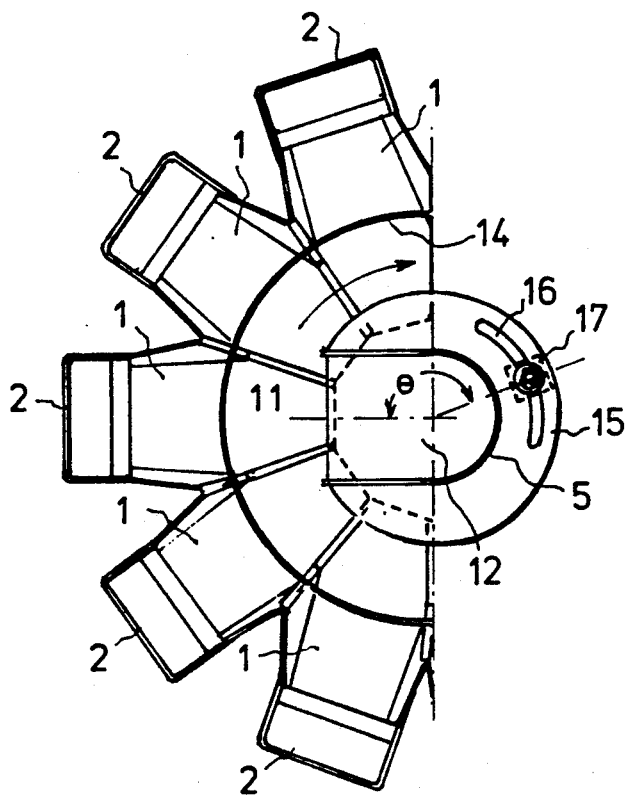
FIG. 2 is a partial plan view of the embodiment of FIG. 1.

Referring to FIGS. 1 and 2, a combination weigher ten comprises radially arranged ten conveyer troughs 1, ten pool hoppers 2 for temporarily holding product fed from the conveyer troughs 1, ten weigh hoppers 3 each coupled to a weight sensor 3a such as a load cell for weighing product fed from the pool hoppers 2, and a common collection chute 4 for collecting product discharged from the weigh hoppers 3. In the center of the weigher, a product dispenser 5 whose structure will be described later is supported by a central rotating shaft 6 and adapted to rotate by means of a reduction motor 7. A product feeding trough 8 driven by a vibrator 9 is disposed above the product dispenser 5 and is adapted to feed the product dispenser 5 with product fed manually or automatically thereto.

Figure 3:
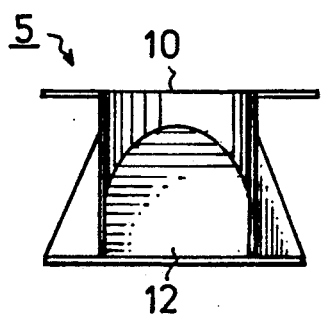
FIG. 3 is a front view of the product dispenser of the embodiment of FIG. 1.

As shown also in FIG. 3, the product dispenser 5 is a chute-shaped structure having a generally U-shaped plan configurations, including an upper inlet port 10, a side exit port 11 and a sloped sliding surface 12 therebetween. The inlet port 10 is provided with a funnel 13 and the exit port 11 faces the proximal end of each conveyer trough 1. The product dispenser 5 is rotationally driven by the reduction motor 7 about the central axis of the dispenser at a fixed speed in the direction of the arrow in FIG. 2 to scan the proximal ends of the surrounding conveyer troughs 1 adjacent its exit port 11. Accordingly, it is possible to feed product to any conveyer trough 1 by selectively driving the vibrator 9 of the feeding trough 8. An annular member 14 is fixed to a machine frame (not shown) to surround the product dispenser 5 above the conveyer troughs 1 to prevent product being fed from the exit port 11 of the product dispenser 5 to the conveyer troughs 1 from scattering out of the machine.

The inlet port 10 of the product dispenser 5 is provided with a flange 15 having an arcuate slot 16 a detector 17 for detecting the thickness of the layer of product at the proximal end of each conveyer trough 1 is adjustably secured in the slot 16 to face the proximal end of the trough. The detector 17 revolves with the rotation of the dispenser 5 to sequentially scan the conveyer troughs 1 to send corresponding detection signals to a control unit 19 through a slip ring 18. The control unit 19 is adapted to compare each detection signal with a value representing a reference layer thickness previously set in a reference register 20, and to drive the vibrator 9 in response to the difference therebetween for feeding a suitable amount of product from the feeding trough 8 through the dispenser 5 to a corresponding conveyer trough 1. The time lag from the detection by the detector 17 to the delivery of product to the conveyor trough must equal the time of rotation of the dispenser through angle $\theta$ of FIG. 2. This angle $\theta$ may be adjusted in accordance with the speed of rotation by securing the detector 17 in the appropriate position relative to slot 16. While the type of detector 17 is optional, a commercially available ultrasonic or inflared ray reflection detector is preferable, for example.

As well known in the art, some (but not all) of the weigh hoppers 3 discharge product to the collection chute 4 every combination operation of the weigher and they are replenished with product from the corresponding pool hoppers 2. Then, the vibrators 21 of the corresponding conveyer troughs 1 are selectively driven to replenish these pool hoppers 2 with product. Therefore, the amount of product at the proximal ends of these latter conveyer troughs is substantially less than the amount of product at the proximal lens of those conveyor which were not vibrated. The feeding device of this invention serves to detect this difference by the revolving detector 17 and suitably supplement the reduction of product in the appropriate conveyer troughs always maintaining the thickness of the product layer on each conveyer trough 1 at a fixed value. When supplementing the aforementioned reduction, it is preferable to repeatedly supplement in relatively small amounts rather than to supplement in one large amount at one time. In this case, the speed of rotation of the dispenser 5 is preferably one rotation per one or two combination operations.

Figure 4:
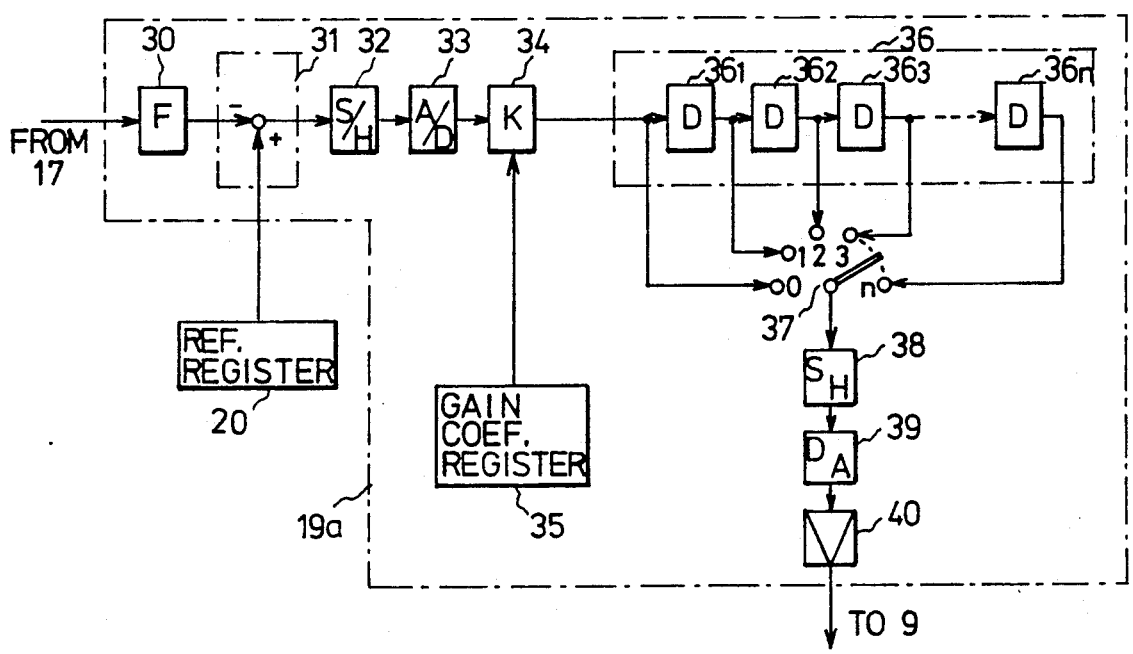
FIG. 4 is a block circuit diagram showing a modification of the control unit of the embodiment of FIG. 1.

While the angle of attachment $\theta$ of the detector 17 must be adjusted in accordance with the speed of rotation of the product dispenser 5 in the abovementioned embodiment as described above, this operation is troublesome since it requires stopping the operation of the weigher. However, the control unit 19, can be modified to provide for this adjustment by means of electrical switching, as shown in FIG. 4.

As shown, an analog detection signal from the detector 17 (FIG. 1), which is proportional to the thickness of the product layer, is first filtered by a low-pass filter 30 to remove its undesirable high frequency component and then subtracted from a reference value in the reference register 20 by a comparator circuit 31 consisting of a subtractor to arrive at a deviation signal. The deviation signal has a positive value when the layer thickness is less than the reference value. The deviation signal is sampled at a period of 0.05 second by a sample-and-hold circuit 32 to become a discrete time-series of signals and, after being stored temporarily, converted into a digital signal by a analog-to-digital convertor 33. The digital signal is then multiplied by a gain coefficient multiplier 34 and, thereafter, supplied to a delay unit 36. The delay unit 36 is composed of a shift register including n cascaded delay elements $36_1m\ 36_2 \ldots 36_n$ and the input of the delay unit 36 and the outputs of the respective elements are connected to fixed contacts 0, 1, 2, ... n of a change-over switch 37 as shown. The output of the change-over switch 37 is supplied through a second sample and hold circuit 38, a digital-to-analog convertor 39 and an output amplifier 40 to a vibrator 9 (FIG. 1) as an analog drive signal. The vibrator 9 is adapted to change its amplitude in accordance with the value of this drive signal. As the signal is sequentially shifted from the left to the right between the adjoining delay elements at the period of 0.05 second, an output delayed by 0.05 k seconds from the input appears at the contact k of the switch 37, for example. Accordingly, if the switch is previously set to the terminal 0 and the abovementioned angle of attachment $\theta$ is adjusted with respect to the maximum speed of rotation to be used, it is possible to compensate for the time lag when the speed of rotation is reduced, by changing the switch 37 the contact k so that it is equal to 0.05 k seconds.

Figure 5:
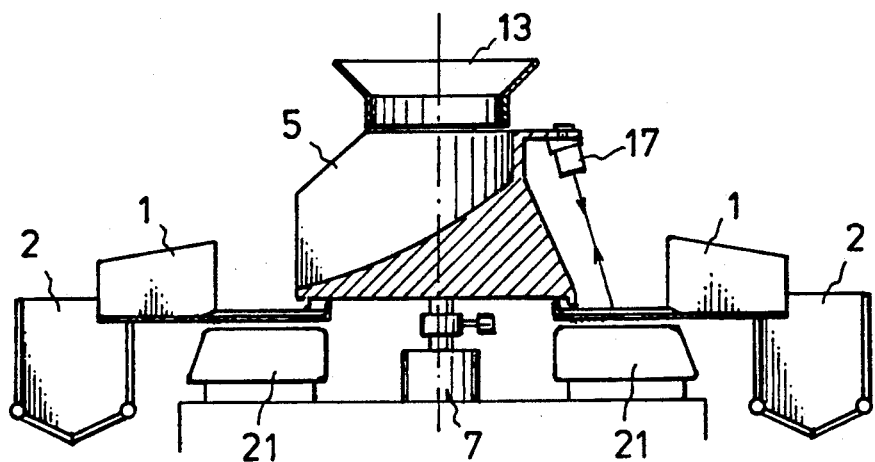
FIG. 5 is a sectional side view, similar to FIG. 1, showing a modification of the embodiment of FIGS. 1 and 2.
Figure 6:
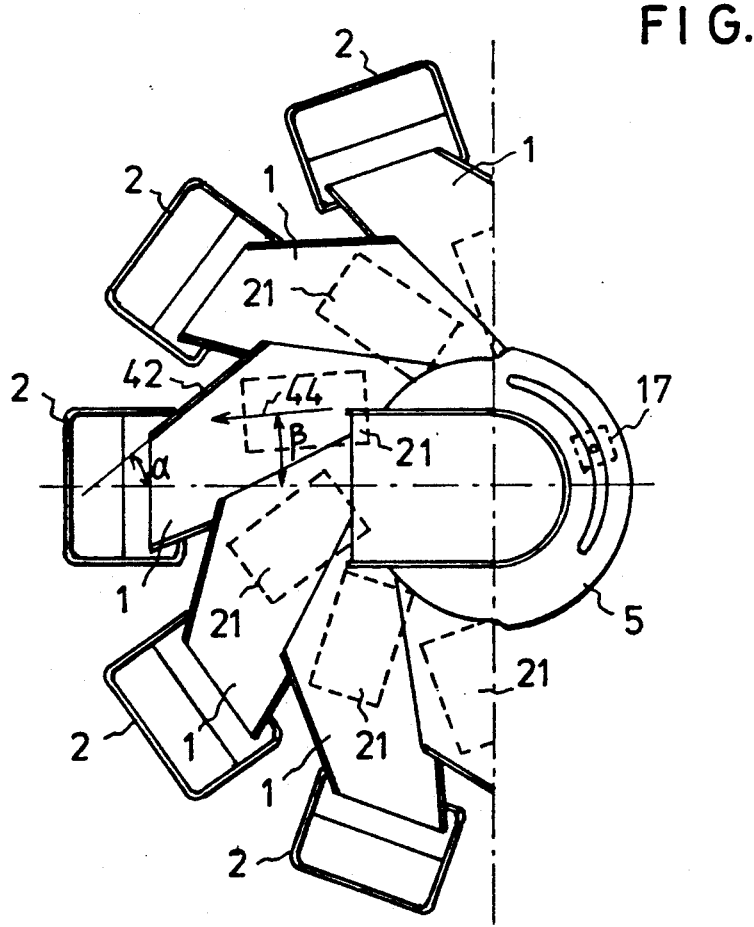
FIG. 6 is a partial plan view, similar to FIG. 2, of the modified embodiment of FIG. 4.

FIGS. 5 and 6 show a modification of the abovementioned embodiment. This modification differs from the embodiment in the shape and arrangement of the conveyer troughs 1. As shown, one of the side walls designated 42 is original at an angle $\alpha$ with respect to the centerline of each pool hopper 2, and the direction of vibration of each vibrator 21 or the direction of conveyance of product is skewed at an angle $\beta$ relative to such centerline. As a result product fed from the product dispenser 5 to each conveyer trough 1 moves along this side wall 42 after reaching the same. Accordingly, when the product is rod-shaped or rectangular, it tends to align in a direction generally parallel to the side wall, so that the thickness of the product layer on the conveyer trough 1 is likely to become uniform. Moreover, this oblique arrangement of the conveyor troughs has an advantage in that the floor area of each conveyer trough can be increased to increase the amount of accumulated product without increase overall diameter of the weigher.

Figure 8:
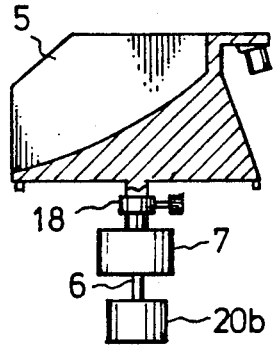
FIGS. 7, 8 and 9 are a sectional side view a circuit diagram and a, perspective view, respectively, illustrative of another modification of the control unit of the embodiment of FIG. 1.
Figure 7:
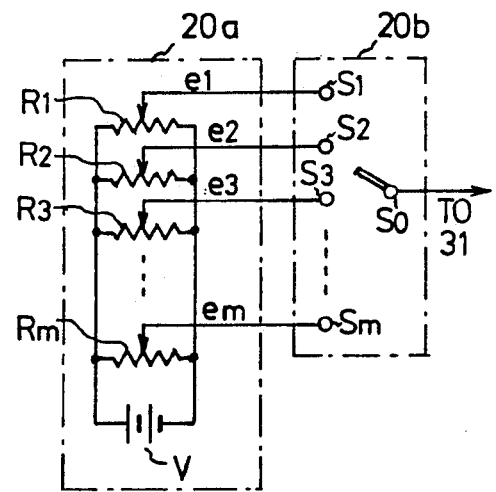
Figure 9:
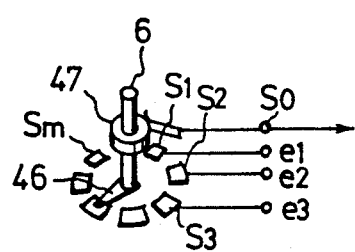

While, in the abovementioned embodiments, the amount of product fed to each weigh unit is uniform, there may be an occasion which demands variation. For example, when effecting two kinds of combinations having different target weights by a single combination weigher, more particularly, effecting one combination by using one half of the weigh units and the other combination by using the remaining weigh units, the amount of feed or supplement to both groups must be different from each other. A modification of the reference register 20, as shown in FIG. 7, which is useful for this purpose comprises a signal generator 20a and a switch 20b. The signal generator 20a includes potentiometers $R_1$, $R_2, \ldots, R_m$ where the number m is equal to the number of weigh units connected in parallel to a constant voltage source V to produce signal voltages $e_1, e_2, \ldots e_m$ at fixed contacts $S_1, S_2, \ldots S_m$ respectively of the switch 20b connected to the movable contacts of these potentiometers. The switch 20b is attached to the rotating shaft 6 of the product dispenser 5 as shown in FIG. 8, and each signal voltage is derived from each fixed contact through a movable contact 46 and a slip ring 47 attached to the rotating shaft 6 at an output terminal $S_0$. By manually adjusting the respective potentiometers of the signal generator 20a, the reference value of the layer thickness on each conveyer trough 1 and, therefore, the desired object can be attained.

Figure 10:
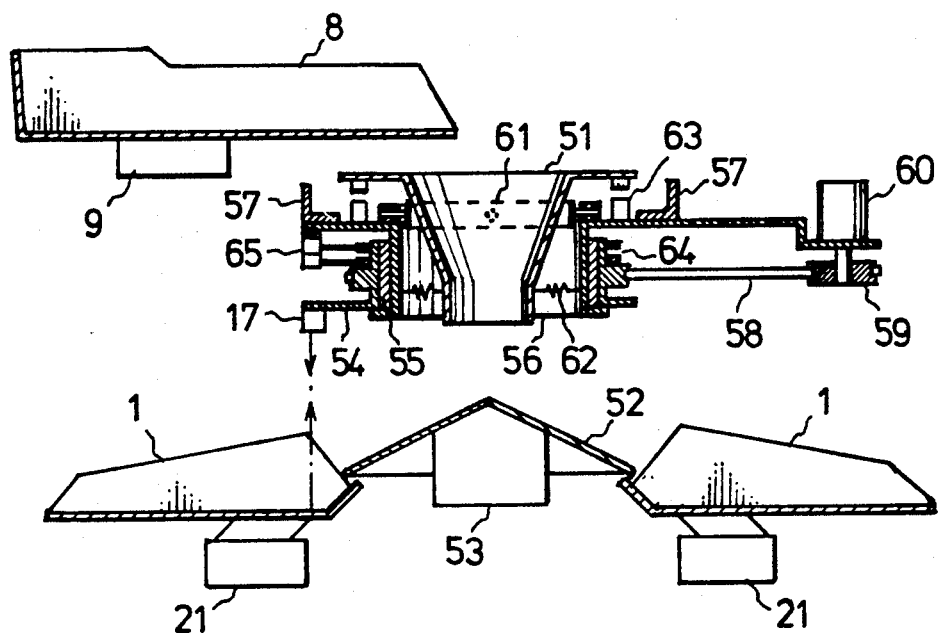
FIG. 10 is a sectional side view showing part of a combination weigher provided with another embodiment of the product feeding device according to this invention.

The revolving detector 17 of this invention can be applied also to a product feeding device having a product dispenser of stationary vibration type, a so-called dispersion feeder. An embodiment thereof is shown in FIG. 10. In this embodiment, product is fed from a product feeding trough 8 provided with a vibrator 9 through a funnel 51 to the center of a conical dispersion feeder 52. The dispersion feeder 52 is vibrated by an accompanying vibrator 53 to dispersively feed the product to the surrounding conveyer troughs 1. A detector 17 is fixed to a rotary frame 54 to face the proximal ends of the conveyer troughs 1. The rotary frame 54 is rotatably supported through a bearing 55 by a support frame 56 which is further supported by a machine frame 57, and it is adapted to be driven at a fixed speed by a motor 60 through a belt 58 and a pulley 59. A funnel 51 is compliantly supported by a gyroscopic support mechanism 61 and vertically held by a restoration mechanism illustrated by springs 62. Electromagnetic attracting devices 63 are disposed between an upper flange of the funnel 51 and the support frame 62 at positions corresponding to the respective conveyer troughs 1.

The detection signal from the detector 17 is supplied through slip rings 64 and brushes 65 to a control unit which is similar to the control unit 19 of FIG. 1, and an electromagnetic attracting device 63 is energized by a control signal from the control unit to more (tilt) the funnel 51 in the direction of the corresponding conveyer trough 1. As the vibrator 9 of the product feeding trough 8 operates also in the same fashion as described above, product is delivered toward the desired conveyer trough 1. The electromagnetic attracting device 63 can be substituted with a mechanical device such as air-cylinder or the like.

Figure 11:
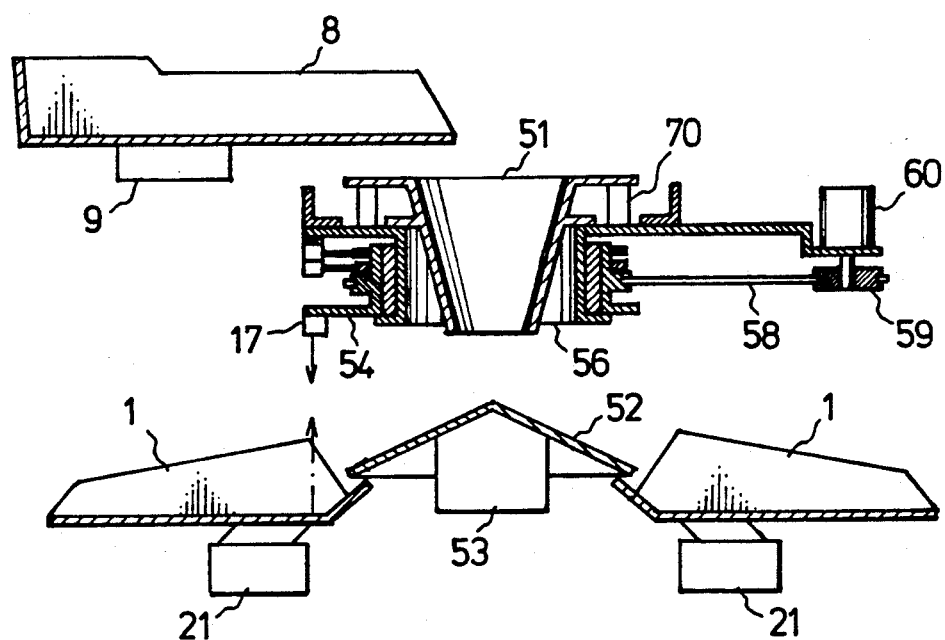
FIG. 11 is a sectional side view showing a modification of the embodiment of FIG. 10.

The device of FIG. 11 is a modification of the embodiment of FIG. 10 and is the same as the abovementioned embodiment except for the supporting and tilting means of the funnel 51. In FIG. 11, the funnel 51 is supported above the support frame 56 by a so-called XY motion mechanism to enable free movement in mutually orthogonal directions. More particularly, the abovementioned effect can be obtained by horizontally displacing the funnel 51 in accordance with the detection signal from the detector 17. This horizontal displacement may be effected manually in accordance with the value of the detection signal indicated on an indicator (not shown). It will be understood by those skilled in the art how to automate this operation by using a computer and servo-motor.

The above description of the embodiments has been given for illustrative purpose only and is not intended to limit the scope of the invention. It should be obvious to those skilled in the art that various modifications and changes can be added to these embodiments without leaving the spirit and scope of the invention as defined in the appended claims. For example, the feeding trough 8 may be substituted with a belt conveyer which is adapted to be controlled in its driving speed and/or time.

I claim:

1. A product feeding device used in a combination weigher comprising a plurality of weight units arranged circularly around a central axis, a plurality of conveyer troughs radially arranged around said central axis for feeding product to said weigh units, and a central product dispensing means for feeding product to said conveyer troughs, said device comprising:

a detector;

means for revolving said detector about said central axis such that said detector sequentially detects the amount of product on each of said conveyer troughs, said detector being adapted to provide a detection signal corresponding to the amount of product detected in each conveyer trough, and control means responsive to said detection signal for controlling the amount of product fed from said product dispensing means to the corresponding conveyer trough.

2. A product feeding device as set forth in claim 1 wherein said product dispensing means comprises a body including an upper inlet port and a side outlet port facing the proximal ends of said conveyer troughs, and means for rotating said body about said central axis; wherein said detector is attached to the body of said product dispensing means and adapted to revolve with said body for sequentially scanning said conveyer troughs; and wherein said control means comprises primary feeding means for feeding product to the upper inlet port of said body, and drive means responsive to said detection signal for driving said primary feeding means to feed product through said product dispensing means for exit from said outlet port for delivery to said conveyer troughs.

3. A product feeding device as set forth in claim 2, wherein said detector is positioned so that the time lag from the detection by said detector to the feed of product by said product dispensing means to said conveyer troughs equal the time of rotation of the body of said product dispensing means through an angle of rotation corresponding to the angle between the outlet port of said product dispensing means and said detector.

4. A product feeding device as set forth in claim 2, wherein said control means includes delay circuit means for compensating for a difference between said time lag and said time of rotation of the body of said product dispensing means through said angle of rotation.

5. A product feeding device as set forth in claim 2, wherein said control means includes means for comparing said detection signal from said detector with a predetermined reference value to provide a control signal proportional to the difference therebetween, and said drive means is adapted to control the amount of feed from said primary feeding means in accordance with said control signal.

6. A product feeding device as set forth in claim 5, wherein said comparing means includes means for providing a plurality of reference values corresponding to a plurality of said angles of rotation, and switching means for selectively comparing said reference values with said detection signal.

7. A product feeding device as set forth in claim 2, wherein said primary feeding means is a vibratory feeding trough, and said drive means is a vibrator therefor.

8. A product feeding device as set forth in claim 1, wherein said detector is adapted to detect the thickness of a product layer on each of said conveyer troughs, and said detection signal is proportional to said thickness.

9. A product feeding device as set forth in claim 1 wherein said product dispensing means comprises a dispersion feeder for dispersively feeding product fed to the central portion thereof to the surrounding conveyer troughs by means of vibration; wherein said detector is supported by a rotation mechanism independent of said dispersion feeder so that the detector faces said conveyer troughs and is adapted to revolve about said central axis to sequentially scan said conveyer troughs; and wherein said control means comprises a feeding chute having an outlet port above said dispersion feeder for delivering product to the central portion of said dispersion feeder, primary feeding means for feeding product to said feeding chute, drive means responsive to said detection signal for driving said primary feeding means to feed product through said feeding chute to said dispersion feeder, and displacing means responsive to said detection signal for moving said feeding chute to displace the outlet port thereof from the center of said dispersion feeder toward the conveyer trough corresponding to said detection signal.

10. A product feeding device as set forth in claim 9, wherein said displacing means comprises a gyroscopic support mechanism for compliantly supporting said feeding chute, and means responsive to said detection signal for tilting said feeding chute to displace the outlet port thereof toward said corresponding conveyer trough.

11. A product feeding device as set forth in claim 10, wherein said tilting means includes an electromagnetic attraction mechanism.

12. A product feeding device as set forth in claim 9, wherein said displacing means includes a support mechanism for said feeding chute which enables horizontal movement of said feeding chute in two orthogonal directions.

13. A product feeding device used in a combination weigher comprising a plurality of weight units arranged circularly around a central axis, and a plurality of conveyer troughs arranged around said central axis for feeding product to said weigh units, said device comprising a body including an upper inlet port, a side outlet port adapted to face the proximal ends of said conveyer troughs one at a time, and a sliding surface sloping primarily in one direction connecting said inlet and outlet ports for feeding product to the conveyer troughs one at a time, and means for rotating said body about said central axis whereby product fed into said inlet port is adapted to slide down said sloped surface and out said outlet port for sequential delivery to the conveyor troughs.

* * * * *

UNITED STATES PATENT AND TRADEMARK OFFICE
CERTIFICATE OF CORRECTION

PATENT NO. : 5,074,436

DATED : December 24, 1991

INVENTOR(S) : Shinichi Inoue

It is certified that error appears in the above-identified patent and that said Letters Patent is hereby corrected as shown below:

Column 1, line 18, "units and" should read ---units, and---.

Column 1, line 20, "troughs, The" should read ---troughs. The---.

Column 2, line 1, "adapted to receive" should read ---adapted to revolve---.

Column 2, line 47, "ten comprises radially" should read ---comprises ten radially---.

Column 3, lines 13-14, "16 a detector" should read ---16. A detector---.

Column 3, line 38, "weigher and" should read ---weigher, and---.

Column 3, lines 45-46, "proximal lens of those conveyor which" should read ---proximal ends of those conveyor troughs which---.

Column 3, lines 49-50, "troughs always" should read ---troughs thereby always---.

Column 4, line 38, "is original at an" should read ---is oriented at an---.

UNITED STATES PATENT AND TRADEMARK OFFICE
CERTIFICATE OF CORRECTION

PATENT NO. : 5,074,436

DATED : December 24, 1991

INVENTOR(S) : Shinichi Inoue

It is certified that error appears in the above-identified patent and that said Letters Patent is hereby corrected as shown below:

Column 4, line 52, "increase overall" should read --increasing the overall--.

Signed and Sealed this

Sixth Day of July, 1993

Attest:

MICHAEL K. KIRK

Attesting Officer

Acting Commissioner of Patents and Trademarks